(12) United States Patent
Gaik et al.

(10) Patent No.: US 11,269,951 B2
(45) Date of Patent: Mar. 8, 2022

(54) INDEXING VARIABLE BIT STREAM AUDIO FORMATS

(71) Applicant: DOLBY INTERNATIONAL AB, Amsterdam Zuidoost (NL)

(72) Inventors: Marek Gaik, Wroclaw (PL); Michal Oleszczuk, Wroclaw (PL)

(73) Assignee: Dolby International AB, Amsterdam Zuidoost (NL)

( * ) Notice: Subject to any disclaimer, the term of this patent is extended or adjusted under 35 U.S.C. 154(b) by 693 days.

(21) Appl. No.: 15/591,432

(22) Filed: May 10, 2017

(65) Prior Publication Data
US 2017/0329849 A1 Nov. 16, 2017

Related U.S. Application Data

(60) Provisional application No. 62/335,378, filed on May 12, 2016.

(30) Foreign Application Priority Data

May 12, 2016 (EP) .................................... 16169357

(51) Int. Cl.
*G06F 16/61* (2019.01)
*G06F 16/68* (2019.01)
(Continued)

(52) U.S. Cl.
CPC .............. *G06F 16/61* (2019.01); *G06F 3/165* (2013.01); *G06F 16/686* (2019.01);
(Continued)

(58) Field of Classification Search
CPC ........ G06F 16/61; G06F 16/686; G06F 3/165; G10L 19/167; G10L 19/24; G11B 27/105; G11B 27/327
See application file for complete search history.

(56) References Cited

U.S. PATENT DOCUMENTS 5,627,936 A 5/1997 Prasad
9,521,455 B1 * 12/2016 Gupta ................ H04N 21/4334
(Continued)

FOREIGN PATENT DOCUMENTS

EP 1286351 2/2003
EP 2279510 2/2011
(Continued)

OTHER PUBLICATIONS

Internet Citation, "Hash function, from Wikipedia", Apr. 18, 2008, XP007904620, http://en.wikipedia.org/wiki/hash_function [retrieved on Apr. 24, 2008].

*Primary Examiner* — Matthew J Ellis (57) ABSTRACT

Methods, systems, and apparatus, including computer programs encoded on computer storage media, for index variable bit stream audio files. One of the methods includes repeatedly receiving audio frames of a variable bit rate representation of an audio signal, wherein the variable bit rate representation comprises multiple portions that each represent one or more audio samples of the audio signal, and wherein at least two of the multiple portions have different respective bit rates. For each received audio frame, a position within the audio signal corresponding to the audio frame is determined. A location within an audio file corresponding to the position is determined. A hash value is computed from the determined position. A particular bucket of a plurality of buckets is identified according to the computed hash value. An indexed pair comprising the determined position and the determined location is generated and stored in association with the particular bucket.

17 Claims, 7 Drawing Sheets

(51) Int. Cl.
*G11B 27/32* (2006.01)
*G11B 27/10* (2006.01)
*G06F 3/16* (2006.01)
*G10L 19/16* (2013.01)
*G10L 19/24* (2013.01)

(52) U.S. Cl.
CPC ............ *G10L 19/167* (2013.01); *G10L 19/24* (2013.01); *G11B 27/105* (2013.01); *G11B 27/327* (2013.01)

(56) References Cited

U.S. PATENT DOCUMENTS

| | | | |
|---|---|---|---|
| 10,885,109 B2 * | 1/2021 | DiMaria | G06F 16/61 |
| 2002/0154691 A1 | 10/2002 | Kost | |
| 2003/0002533 A1 | 1/2003 | Rajwan | |
| 2003/0009718 A1 | 1/2003 | Wolfgang | |
| 2003/0078930 A1 | 4/2003 | Surcouf | |
| 2007/0016314 A1 * | 1/2007 | Chan | G11B 19/022 |
| | | | 700/94 |
| 2007/0198838 A1 * | 8/2007 | Nonaka | G06F 21/10 |
| | | | 713/176 |
| 2008/0033986 A1 | 2/2008 | McCusker | |
| 2009/0132599 A1 | 5/2009 | Soroushian | |
| 2009/0277322 A1 * | 11/2009 | Cai | G10H 1/0058 |
| | | | 84/609 |
| 2009/0297123 A1 | 12/2009 | Virdi | |
| 2009/0299505 A1 * | 12/2009 | Honza | G11B 27/322 |
| | | | 700/94 |
| 2009/0300204 A1 | 12/2009 | Zhang | |
| 2011/0096828 A1 | 4/2011 | Chen | |
| 2011/0150099 A1 | 6/2011 | Owen | |
| 2011/0246603 A1 | 10/2011 | Lee | |
| 2011/0296048 A1 | 12/2011 | Knox | |
| 2011/0302207 A1 * | 12/2011 | Asmundsson | G06F 16/70 |
| | | | 707/780 |
| 2012/0265853 A1 | 10/2012 | Knox | |
| 2013/0096929 A1 | 4/2013 | Jax | |
| 2014/0281988 A1 | 9/2014 | Watts | |
| 2014/0288686 A1 | 9/2014 | Sant | |
| 2014/0317668 A1 | 10/2014 | Zhang | |
| 2015/0188974 A1 | 7/2015 | Garcia-Mendoza Sanchez | |
| 2015/0189344 A1 * | 7/2015 | Amidei | H04N 21/4325 |
| | | | 725/116 |
| 2016/0148620 A1 * | 5/2016 | Bilobrov | G10L 25/54 |
| | | | 704/270 |
| 2016/0154880 A1 * | 6/2016 | Hoarty | H04N 21/278 |
| | | | 707/770 |

FOREIGN PATENT DOCUMENTS

| | | |
|---|---|---|
| EP | 2685456 | 1/2014 |
| WO | 2011/090715 | 7/2011 |

* cited by examiner

INDEXING VARIABLE BIT STREAM AUDIO FORMATS

CROSS-REFERENCE TO RELATED APPLICATIONS

This application claims priority from U.S. Patent Application No. 62/335,378 filed May 12, 2016 and European Patent Application No. 16169357.7 filed May 12, 2016 which are hereby incorporated by reference in their entirety.

BACKGROUND

This specification relates to audio encoding.

Some digital audio encoding formats are variable bit stream formats (e.g., bit stream formats with variable bit rate). A representation, e.g., an electronic audio file, of an audio signal encoded in a variable bit stream format (e.g., encoded with variable bit rate) has multiple portions of audio samples in which the bit rates of the multiple portions are not all the same. For example, the bit rate is higher for complex portions of an audio signal and lower for less complex portions of the audio signal.

For brevity, such representations of audio signals will be referred to as audio files. However, an audio file need not actually be a file in a file system. Rather, an audio file can be an object stored in any appropriate data storage subsystem, e.g., as a record in a database, as a portion of random access memory, to name a few examples. In addition, an audio file need not contain exclusively audio data. For example, files that also contain encoded video information are also audio files if they contain representations of encoded audio signals.

A decoder can reconstruct an audio signal by decoding an audio file. An appropriate output device, e.g., a loud speaker, can then convert the audio signal into actual sound waves. For brevity, decoding the representation will be referred to as playback. Audio may be, but need not be, generated during playback of an audio file.

Seeking refers to initiating playback at a particular position in the original audio signal, which position will be referred to as a seek position. The seek position can be specified by a time offset or a number of audio frames from the beginning of the original audio signal. For example, a listener may desire to initiate playback of a song encoded in an audio file at 2 minutes and 30 seconds after the start of the song. The listener can do so by providing a seek position corresponding to that point in time of the audio signal.

In order to seek, a decoder must find a location in the audio file corresponding to the seek position. The location within the audio file can be represented as a pointer to an address, as a byte offset from the beginning of the audio file, or in any other appropriate format. The elapsed time that it takes the decoder to find the seek position will be referred to as the seek time.

One way of finding a location corresponding to the seek position is for the decoder to decode portions of the audio file starting from the beginning of the audio file until the seek position is reached. This approach does not scale well because seek times increase proportionally with increasing sizes of audio files, and some applications require near instantaneous seek times.

Generally, for variable bit stream formats there is not a proportional correspondence between the position given by a seek request and a location within an audio file. In other words, halfway through a song in listener time does not generally or predictably correspond to halfway through an audio file in terms of the size of the file in memory.

SUMMARY

This specification describes how a system can generate an index to support arbitrary seeking within a variable bit rate audio file.

According to one aspect, a computer-implemented method is described. The method may include receiving a seek request with respect to an audio file (e.g., for a location within the audio file). The audio file may comprise a variable bit rate representation of an audio signal (e.g., a variable bit stream representation of the audio signal). The seek request may include a specified position within the audio signal (e.g., a seek position or playback position within the audio signal, for initiating or resuming playback, e.g., anywhere between the first and last sample of the audio signal, e.g., indicated by a time offset from the start of the audio signal, a sample offset from the start of the audio signal, or a frame number). The variable bit rate representation may comprise multiple portions that each represent one or more audio samples of the audio signal, wherein at least two of the multiple portions may have different respective bit rates. The method may further include generating a hash value from the specified position of the seek request using a hash function (e.g., by applying the hash function to the specified position included in the seek request). The method may further include identifying, using the hash value, a particular bucket in an index having a plurality of buckets. Herein, each bucket may be a logical unit of data that holds multiple entries and that is addressable by a respective identifier. For example, each bucket may be identified by a respective hash value. Each bucket may include a plurality of indexed pairs, wherein each respective indexed pair comprises an indexed position within the audio signal and an indexed location within the audio file (e.g., an address, pointer to an address, byte location, byte offset, etc., within the audio file) corresponding to the indexed position. That is, each bucket may be an array including (storing) a set or collection of indexed pairs. For a given bucket, indexed positions of all indexed pairs within the given bucket may have a same hash value (e.g., the respective hash value identifying the given bucket) (e.g., the hash function may or would generate the same hash value for these positions). The method may further include determining which particular indexed pair of the indexed pairs within the particular bucket has an indexed position that matches the specified position among indexed pairs in the bucket having indexed positions that are less than or equal to the specified position of the seek request. The method may yet further include returning a particular indexed location of the particular indexed pair in response to the seek request.

According to another aspect, a computer-implemented method is described. The method may include repeatedly receiving audio frames of a variable bit rate representation of an audio signal (e.g., a variable bit stream representation of the audio signal). The variable bit rate representation may comprise multiple portions that each represent one or more audio samples of the audio signal, and at least two of the multiple portions may have different respective bit rates. The method may further include performing, for each received audio frame, determining a position within the audio signal corresponding to the audio frame (e.g., a seek position or playback position within the audio signal, for initiating or resuming playback, e.g., anywhere between the first and last sample of the audio signal, e.g., indicated by a time offset from the start of the audio signal, a sample offset from the start of the audio signal, or a frame number). The method may further include performing, for each received audio frame, determining a location within an audio file corresponding to the position (e.g., an address, byte location, byte offset, etc., within the audio file). The audio file may comprise the variable bit rate representation of the audio signal. The method may further include performing, for each received audio frame, computing a hash value from the determined position (e.g., by applying a hash function to the determined position). The method may further include performing, for each received audio frame, identifying a particular bucket of a plurality of buckets (e.g., in an index including a plurality of buckets). Each bucket may be identified by a respective hash value and may include indexed pairs of a position and a location. The positions of the indexed pairs of each given bucket may have a same hash value. The particular bucket may be identified by the computed hash value. The method may further include performing, for each received audio frame, generating an indexed pair comprising the determined position and the determined location. The method may yet further include performing, for each received audio frame, storing the indexed pair in association with the particular bucket. Accordingly, for a given bucket of the index, indexed positions of all indexed pairs within the given bucket have the same hash value.

Particular embodiments of the subject matter described in this specification can be implemented so as to realize one or more of the following advantages. The index does not interfere with the file format of audio standards that do not provide for indexing, and therefore audio files that use indexing are backwards compatible with equipment that does not. No audio standards need to be changed to support indexing, and no data needs to be encoded within the audio file itself. The index can be used to generate very fast seek times. The index can provide interactive seek times, e.g., seek times that seem to be near instantaneous to the user, which in some cases are seek times that are no more than 200 ms. The index can be made relatively small and not to significantly add to the storage overhead of the audio file. The index does not require a complex hash function, nor does the index require dynamic memory allocation during indexing or seeking, which further improve the seek times when using the index. The index can be silently generated during an encoding process. Generating the index during an encoding process does not substantially make the encoding process any longer. If the index is missing, the system can use the audio file to regenerate the index.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
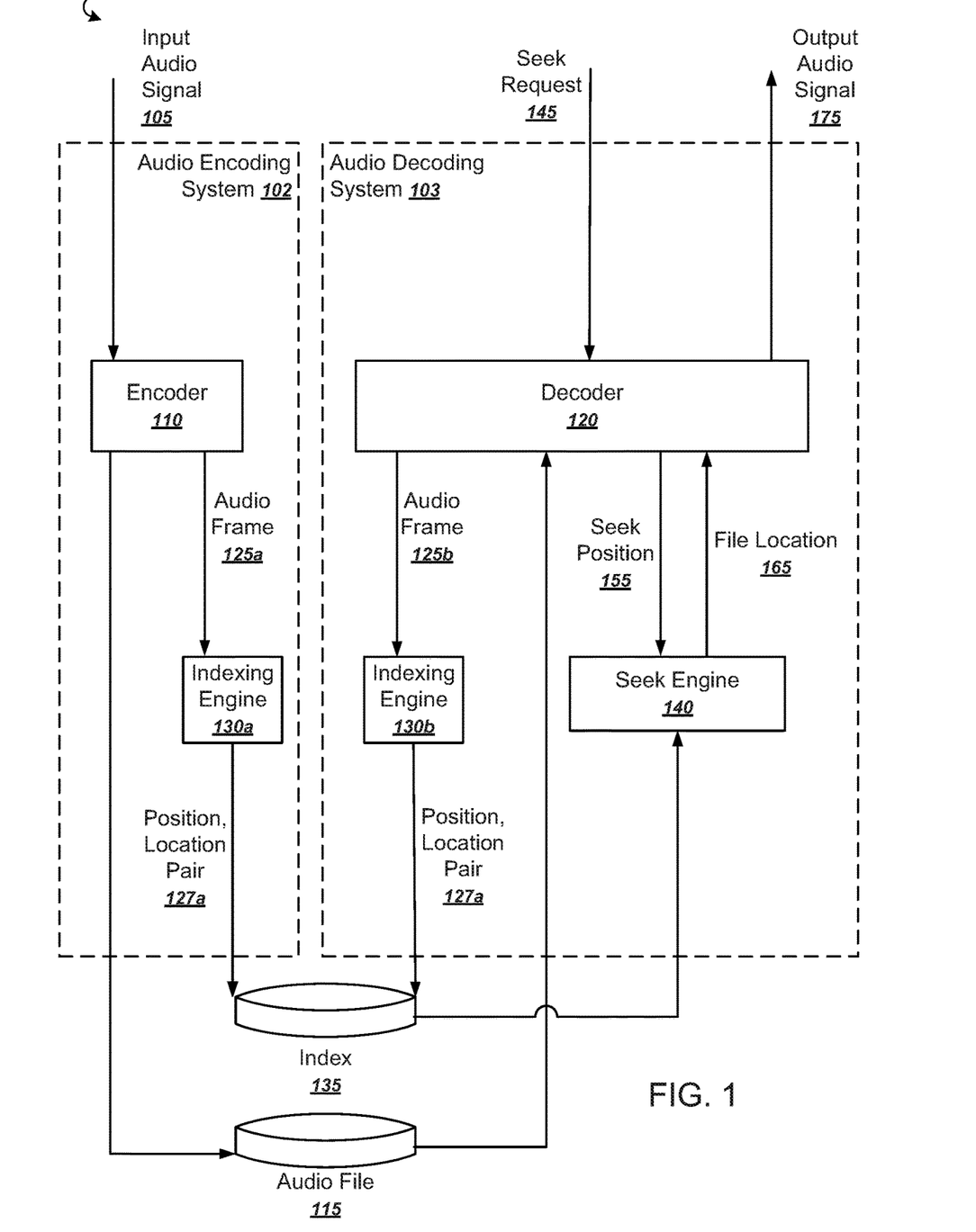
FIG. 1 is a diagram of an example system.

FIG. 1 is a diagram of an example system 100. The system 100 includes an audio encoding system 102 and an audio decoding system 103, which both use an index 135 to support seeking within variable bit rate audio files.

The audio encoding system 102 includes an encoder 110 and an indexing engine 130a. The audio decoding system 103 includes a decoder 120, an indexing engine 130b, and a seek engine 140. Each of these components can be implemented by computer programs installed on one or more computing devices in one or more locations. In addition, the audio encoding system 102 and the audio decoding system 103 can be implemented by the same or different computing devices. If implemented on a same computing device, the encoder 110 and the decoder 120 can use a same indexing engine 130a or 130b.

The encoder 110 is configured to receive an input audio signal 105 and generate an audio file 115. The audio file 115 is (or comprises) a representation of the input audio signal 105 encoded according to a particular encoding process. When encoding the input audio signal 105, the encoder 110 generates audio frames.

Each audio frame includes audio information, e.g., samples that represent a measure of loudness of the input audio signal 105, for a particular point in time of the input audio signal 105. Each audio frame can also include a header with additional metadata. For example, a header can also indicate the length of the audio frame in bytes as well as how many audio samples the audio frame contains.

The decoder 120 receives the audio file 115 and reconstructs the original input audio signal 105 by applying a corresponding decoding process on the audio file 115. The decoder 120 can then generate an output audio signal 175. When decoding the audio file 115, the decoder 120 reads audio frames from the audio file 115. The audio frames that the decoder 120 reads from the audio file 115 correspond to the audio frames generated by the encoder 110.

Either of the encoder 110 or the decoder 120 can generate the index 135 using an indexing engine, e.g., the indexing engine 130a or 130b, as will be described in more detail below. For example, the encoder 110 can generate, from the input audio signal 105, audio frames and can provide the audio frames, e.g., an audio frame 125a, to the indexing engine 130a. The indexing engine 130a can then generate a corresponding position, location pair 127a for the audio frame 125a to store in the index 135. The position, location pair 127a associates a seek position of the input audio signal 105 with a corresponding location in the audio file 115. The location can, for example, be expressed as a pointer to an address or as a byte offset from the beginning of the audio file 115.

Alternatively or in addition, the decoder 120 can read an audio frame 125b from the audio file 115 and provide the audio frame 125b to the indexing engine 130b. The indexing engine 130b can then generate a corresponding position, location pair 127a to store in the index 135.

The index 135 can be stored in association with the audio file 115 in various ways. For example, the index 135 can be stored on disk as an auxiliary file that is separate from the audio file. Or the index 135 can be stored as part of the audio file 115 itself. For example, the first portion of the audio file 115 can be the index 135 itself. Alternatively, the audio decoding system 103 can regenerate the index 135 whenever the audio file 115 is opened by the decoder 120. The audio decoding system 103 can then store the regenerated index 135 in memory or on disk for use when decoding the audio file 115.

In addition, the index 135 can be stored remotely from the audio file 115 at a particular network location. The system can then associate the network location of the index 135 with the audio file 115, e.g., by encoding the network address into the audio file 115.

The decoder 120 can use the index 135 for seeking to any arbitrary position in the original input audio signal upon receiving a seek request 145. The seek request 145 can specify either an audio frame number, a time offset, or a sample offset. The audio frame number represents a number of audio frames from the beginning of the audio file 115.

The decoder can then convert the seek request 145 into a seek position 155, which specifies an audio frame number. If the seek request 145 already specified an audio frame number, no conversion is necessary. If the seek request 145 specified a time offset, the system can convert the time offset to a particular audio frame number by multiplying the time offset by the frame rate of the audio file 115. If the seek request 145 specified a sample offset, the system can convert the sample offset to a particular audio frame number by dividing the sample offset by the number of samples per frame.

The decoder 120 can then use a seek engine 140 to convert the seek position 155 specified by the seek request 145 into a corresponding file location 165 from which to initiate (or resume) playback.

The seek engine 140 reads data in the index 135 to generate a file location 165 for a particular seek position 155. The seek engine can then provide the file location 165 to the decoder 120. The decoder 120 can then initiate playback of the audio file 115 from the file location 165 to generate the output audio signal 175.

Figure 2:
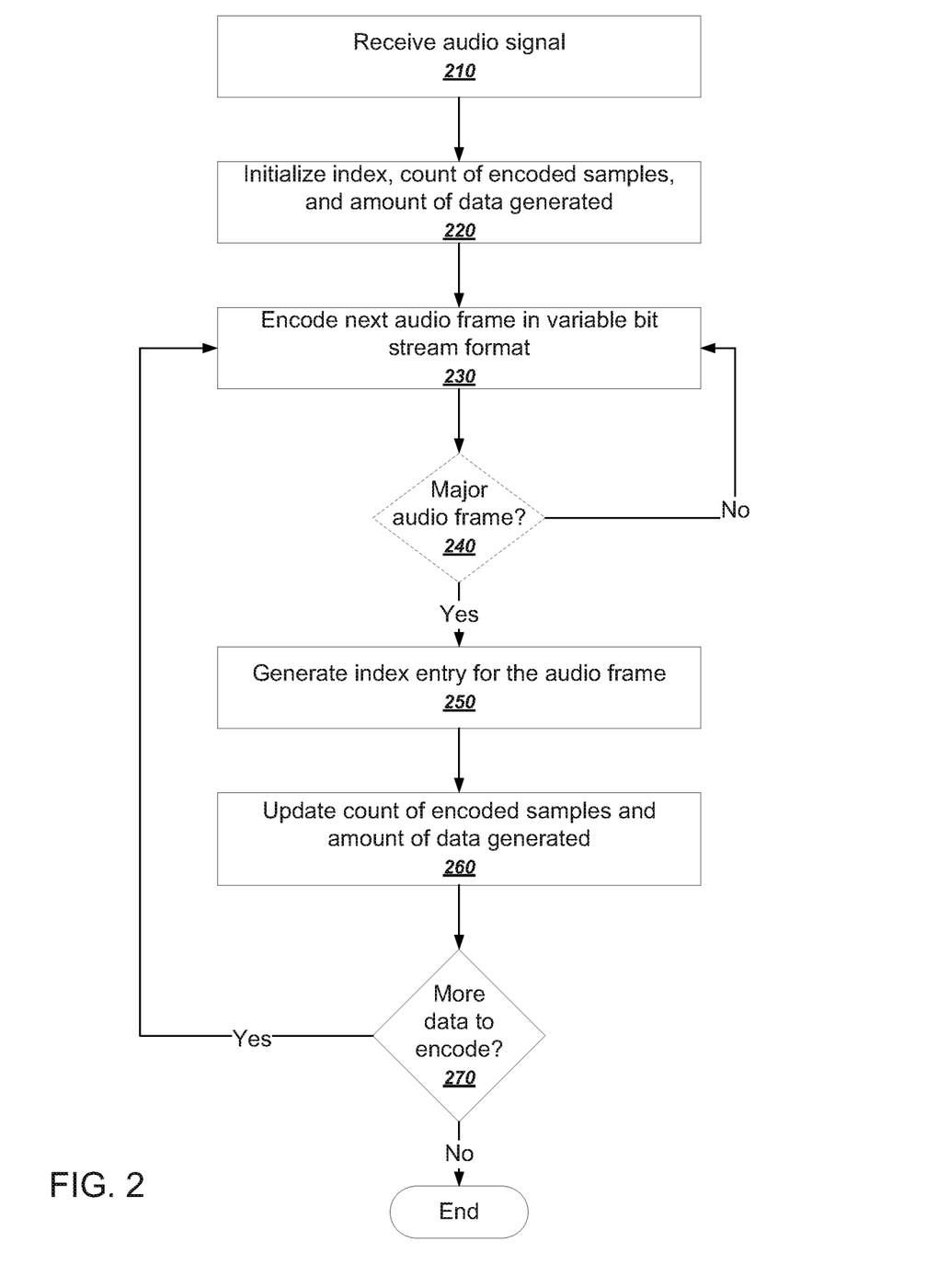
FIG. 2 is a flow chart of an example process for generating an index while encoding a variable bit rate audio file.

FIG. 2 is a flow chart of an example process for generating an index while encoding a variable bit rate audio file (e.g., a variable bit stream audio file). The example process can be performed while encoding an audio signal into an audio file. For convenience, the process will be described as being performed by a system of one or more computers, located in one or more locations, and programmed appropriately in accordance with this specification. For example, an audio encoding system, e.g., the audio encoding system 102 of FIG. 1, appropriately programmed, can perform the process.

The system receives an audio signal (210). For example, the system can receive, by an encoder, an audio signal to be encoded into an audio file.

The system initializes an index, a count of encoded audio frames, and an amount of data generated (220). The structure of the index and how the index is initialized is described in more detail below with reference to FIGS. 4-5.

The system can maintain a running count of encoded audio frames and a running count of an amount of data generated. Thus, to initialize each of these, the system can set both to a respective minimum value, e.g., zero. The system encodes a next audio frame in a variable bit rate format (e.g., a variable bit stream format) (230). The system can use an appropriate encoding procedure to encode a portion of the audio signal into a corresponding audio frame of a variable bit rate format.

The system optionally determines whether the audio frame is a major audio frame (240). Some variable bit stream formats only support playback from particular audio frames designated as major audio frames. For such formats, the system need not generate index entries for audio frames that are not major audio frames. Thus, if the audio frame is not a major audio frame, the system encodes the next audio frame (branch to 230). Otherwise, the process continues.

The system generates an index entry for the audio frame (250). In general, the index entry is a position, location pair (a pair of a position and a location), where the position is a seek position and the location is a location within the audio file being generated. The system can use the count of encoded audio frames as the position, and the amount of data generated as the location. Generating index entries is described in more detail below with reference to FIG. 4.

The system updates a count of encoded audio frames and the amount of data generated (260). To update the count of encoded audio frames, the system can add one to the count of encoded audio frames. To update the amount of data generated, the system can determine the size (e.g., data size) of the most recently generated audio frame and add the result to the amount of data generated.

The system determines whether more data remains to be encoded (270). If so, the system again encodes the next audio frame (branch to 230). Otherwise, the process ends (branch to end).

Figure 3:
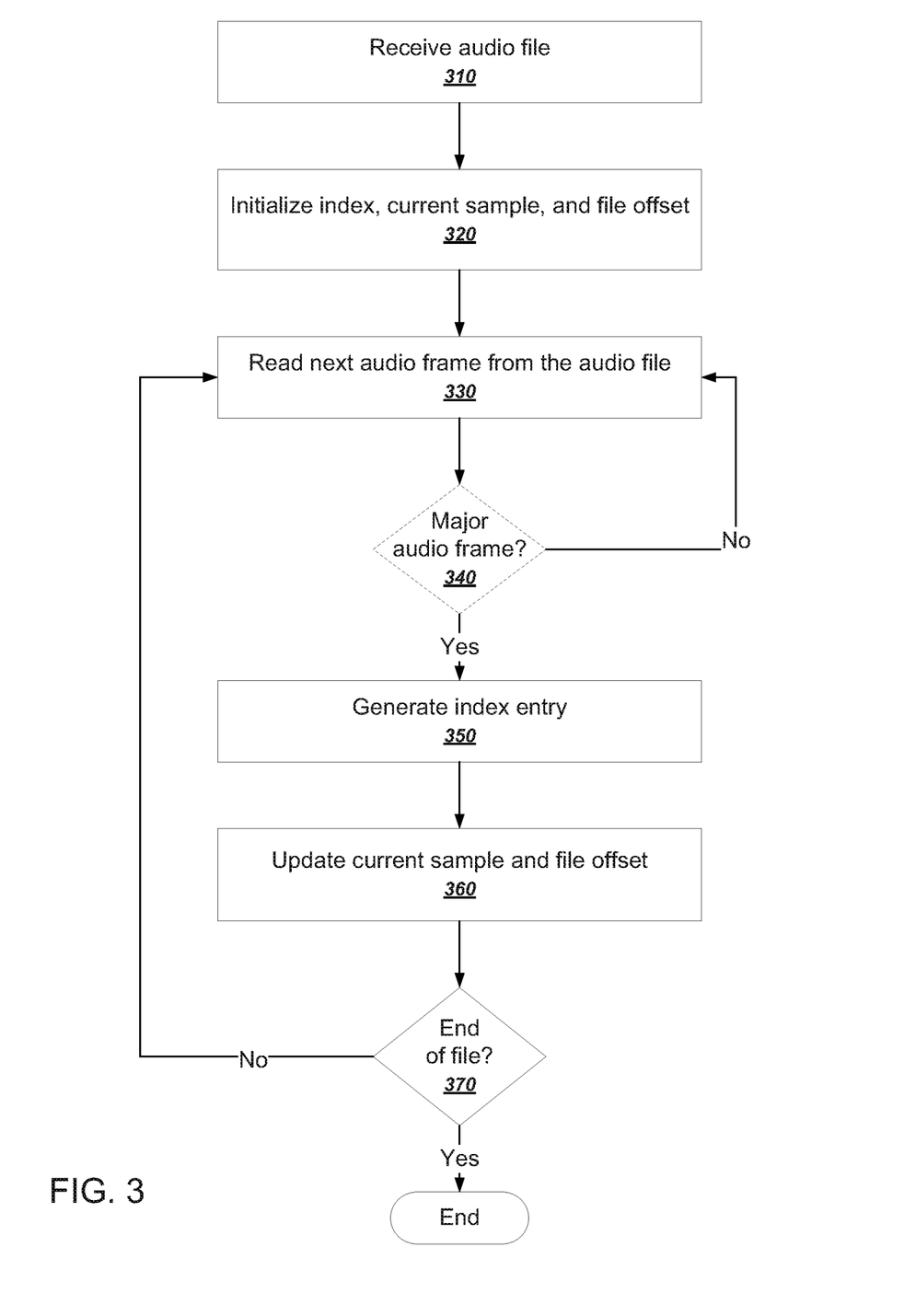
FIG. 3 is a flow chart of an example process for generating an index after encoding a variable bit rate audio file.

FIG. 3 is a flow chart of an example process for generating an index after encoding a variable bit rate audio file (e.g., a variable bit stream audio file). The example process can be performed by a decoder after an audio signal is already encoded into an audio file. For convenience, the process will be described as being performed by a system of one or more computers, located in one or more locations, and programmed appropriately in accordance with this specification. For example, an audio encoding system, e.g., the audio decoding system 103 of FIG. 1, appropriately programmed, can perform the process.

The system receives an audio file (310). For example, the system can receive, by a decoder, a variable bit rate audio file (e.g., a variable bit stream audio file) that represents an original audio signal.

The system initializes an index, a current audio frame, and a file offset (320). The structure of the index and how the index is initialized is described in more detail below with reference to FIGS. 4-5.

The system can maintain a value for a current audio frame, which represents the number of the most recently read audio frame in the entire audio file. The system can also maintain a file offset that represents how much data exists in the audio file from the beginning of the file to the location of the current audio frame. Thus, to initialize each of these, the system can set both to a respective minimum value, e.g., zero.

The system reads a next audio frame from the audio file format (330). The system can use any appropriate decoding procedure to decode a portion of the audio signal from a corresponding audio frame of a variable bit rate format (e.g., variable bit stream format).

Optionally, the system determines, depending on the variable bit rate format, whether the audio frame is a major audio frame (340). As described above, some variable bit stream formats only support playback from particular audio frames designated as major audio frames. Thus, if the audio frame is not a major audio frame, the system reads the next audio frame (branch to 330). Otherwise, the process continues.

The system generates an index entry for the audio frame (350). In general, the index entry is a position, location pair, where the position is a seek position and the location is a location within the audio file being generated. The system can use the current audio frame number as the position, and the file offset as the location. Generating indexing entries is described in more detail below with reference to FIG. 4.

The system updates the (number of the) current audio frame and the file offset (360). To update the (number of the) current audio frame, the system can determine add one to the previous value (number) of the current audio frame. To update the file offset, the system can determine the size of the mostly recently read audio frame and add the result to the current file offset.

The system determines whether the end of the file has been reached (370). If not, the system again reads the next audio frame (branch to 330). Otherwise, the process ends (branch to end).

Figure 4:
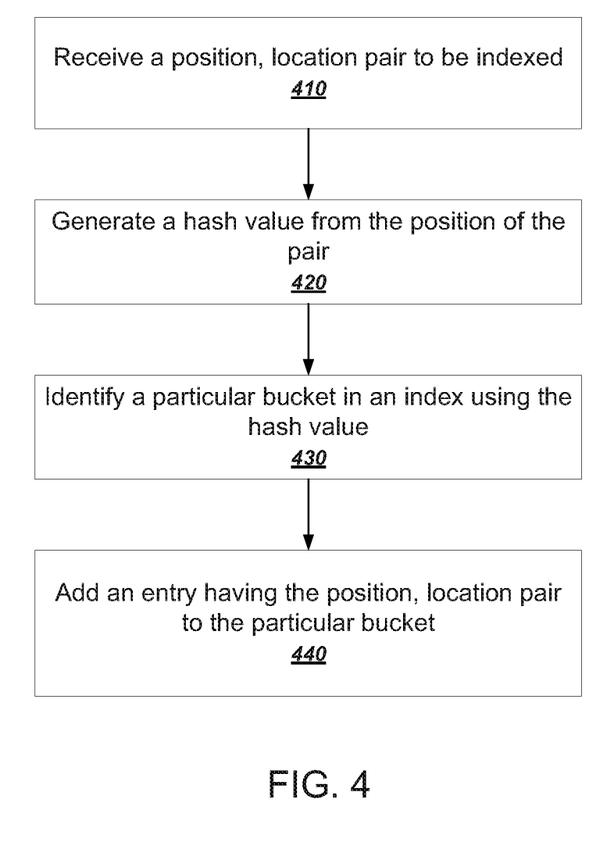
FIG. 4 is a flow chart of an example process for indexing a position, location pair

FIG. 4 is a flow chart of an example process for indexing a position, location pair. For convenience, the process will be described as being performed by a system of one or more computers, located in one or more locations, and programmed appropriately in accordance with this specification. For example, an audio encoding system, e.g., the audio encoding system 102 or the audio decoding system 103 of FIG. 1, appropriately programmed, can perform the process.

The system receives a position, location pair to be indexed (410). The position can be specified either as a number of audio frames, as a time offset from the start of the audio signal, or as a sample offset from the start of the audio signal. The system can convert a time offset into an audio frame number by multiplying the time offset by the frame rate of the audio file. Likewise, the system can convert a sample oddest into an audio frame number by dividing by the number of samples per frame. The location can be specified by a memory pointer (address pointer), a location on disk, or a file offset (e.g., in units of bytes).

The system generates a hash value from the position to be indexed (e.g., by applying a hash function to the position to be indexed, e.g., the position of the position, location pair to be indexed) (420), and the system identifies a particular bucket in an index using the hash value (430). The system uses an index that has a plurality of buckets, each with an identifier corresponding to a possible hash value from the hash function. That is, each index is identified by (and addressable by) a respective possible hash value that the hash function may generate (e.g., that is in the image of the hash function).

Figure 5:
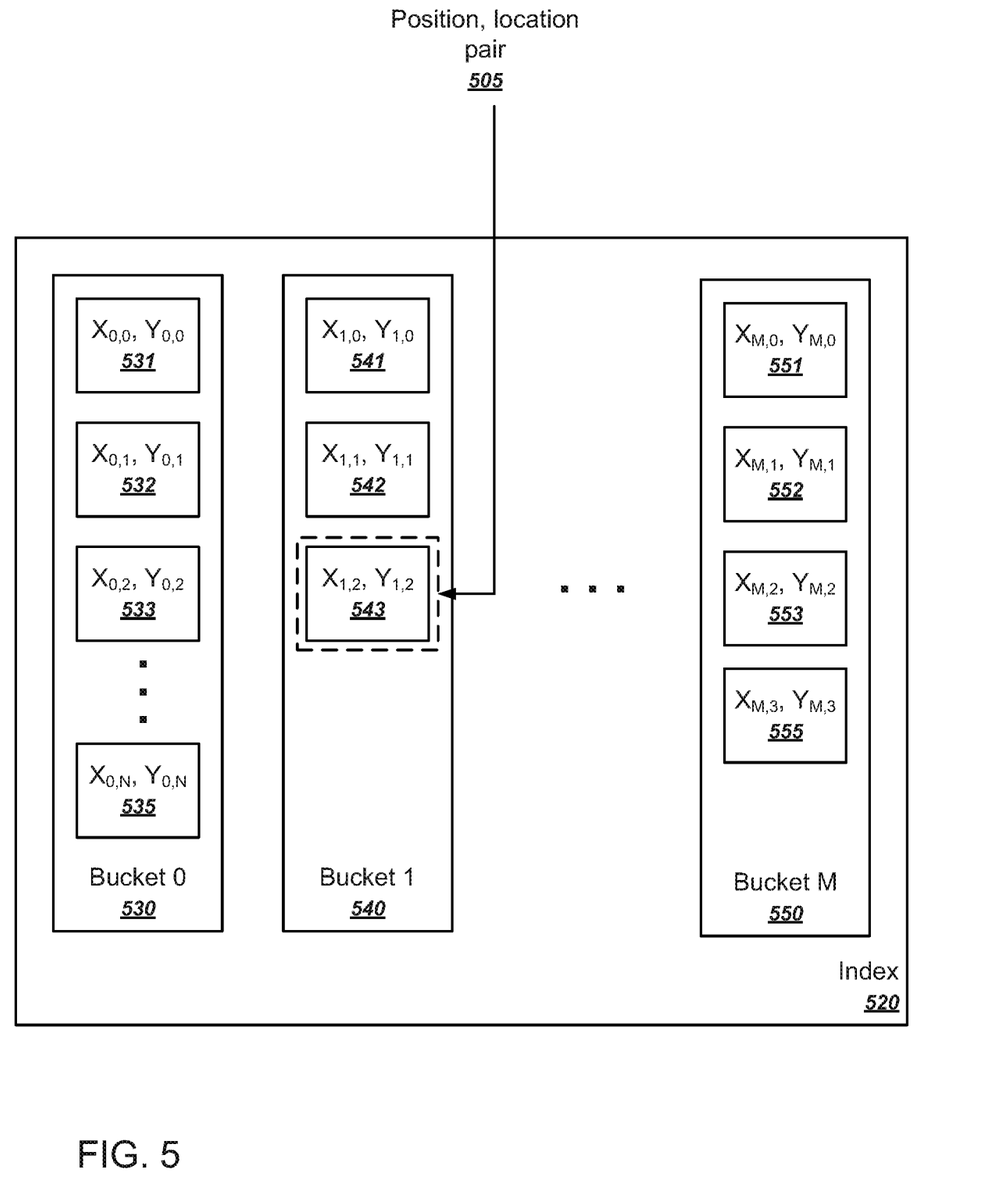
FIG. 5 is a diagram of an example index.

FIG. 5 is a diagram showing the structure of an example index 520. The index 520 has a plurality of buckets 0-M 530, 540, through 550. Within each bucket are indexed pairs, e.g., indexed pairs 531-535, 541-543, and 551-555. Each indexed pair includes an indexed position, e.g., $X_{a,b}$, and an indexed file location, e.g., $Y_{a,b}$. The indexed position of the pair represents a position (e.g., seek position or playback position) in the original audio signal, the indexed location represents a location within the audio file (e.g., a location of an audio frame) that corresponds to the indexed position. In this context, a bucket means an unordered collection without duplicates. In other words, each indexed pair occurs no more than once in a particular bucket. Nor does an indexed pair occur more than once in the index. For convenience and speed of retrieval, the indexed pairs may be ordered when stored in a data storage subsystem, e.g., by the order in which the entries are generated. However, the order of the indexed pairs within a bucket need not depend on the values of the indexed pairs or on the order in which the entries are generated. In general, each bucket may be a logical unit of data that holds multiple entries and that is addressable by a respective identifier. For example, each bucket may be an array including (storing) a set or collection of indexed pairs. For example, each bucket may be identified by a respective hash value, i.e., a possible hash value of the hash function.

The system can implement each bucket with any appropriate data structure. In some implementations, the system uses a data structure that does not require dynamic memory allocation, e.g., a fixed size array.

The system can allocate an amount of storage space for the index based on the content duration, file size of the audio file, or both. In some implementations, the system allocates a default amount of memory for the index. Then, the system can allocate additional storage space for the index if the index ever reaches a threshold size, e.g., 80% of the allocated storage space.

The buckets may, but need not, have the same number of entries. For example, bucket 0 530 has N entries, while bucket 1 540 has 3 entries and bucket M 550 has 4 entries. The number of entries in each of the buckets will depend on a distribution generated by the hash function. If the distribution is a substantially uniform distribution, the buckets will have substantially the same number of entries on average.

When using the index 520 to handle a seek request, the system evaluates (processes) each entry in one of the buckets. Thus, the seek time depends on the number of entries in each bucket. Therefore, the system can limit the number of entries in each bucket based on a worst-case acceptable seek time. For example, if the worst-case acceptable seek time is 100 ms, and the system anticipates needing no more than 3 microseconds to evaluate each entry in a bucket, the system can limit each bucket to having 33,000 entries so that the worst-case seek time is no more than 99 ms.

The system can use a number of buckets that provides a balance between storage size of the index and a worst case seeking time. In general, a relatively small number of buckets having a few thousand entries each provides a good tradeoff between index time and seek performance. The system can use any appropriate hash function that generates an appropriate distribution of hash values over the possible bucket identifiers. In some implementations, the system uses the following function to generate a hash value B that identifies a particular bucket:

$$B = \left\lfloor \frac{S}{R} \right\rfloor,$$

where S is a number (e.g., sample number) in sequence of the audio frame identified by the position to be indexed, and R is the total range of indexed positions within a bucket. The value of R can be given by:

$$R = \frac{T}{M},$$

where T is the total number of audio frames in the audio file and M is the total number of buckets. In some implementations, the system uses a value of R that is a power of 2 so that the calculation of the hash value becomes a simple bit shift to the right of the audio frame identified by the position to be indexed.

In some implementations, the system can obtain the address of the appropriate bucket using the hash value B by taking a base address of the index and adding the hash value B by the size of each bucket.

As shown in in FIG. 4, the system adds an entry having the position, location pair to the particular bucket (440). In other words, the system generates a new entry and adds it to the bucket that is identified by the hash value (the hash value of the indexed position).

In the example of FIG. 5, the position, location pair 505 results in an entry 543 that is placed in bucket 1 540. When inserting new entries into a bucket, the system can insert the entries sequentially. For example, the system can place the entry 543 at the end of allocated portions of bucket 1 540, i.e., in the free space of the bucket.

Figure 6:
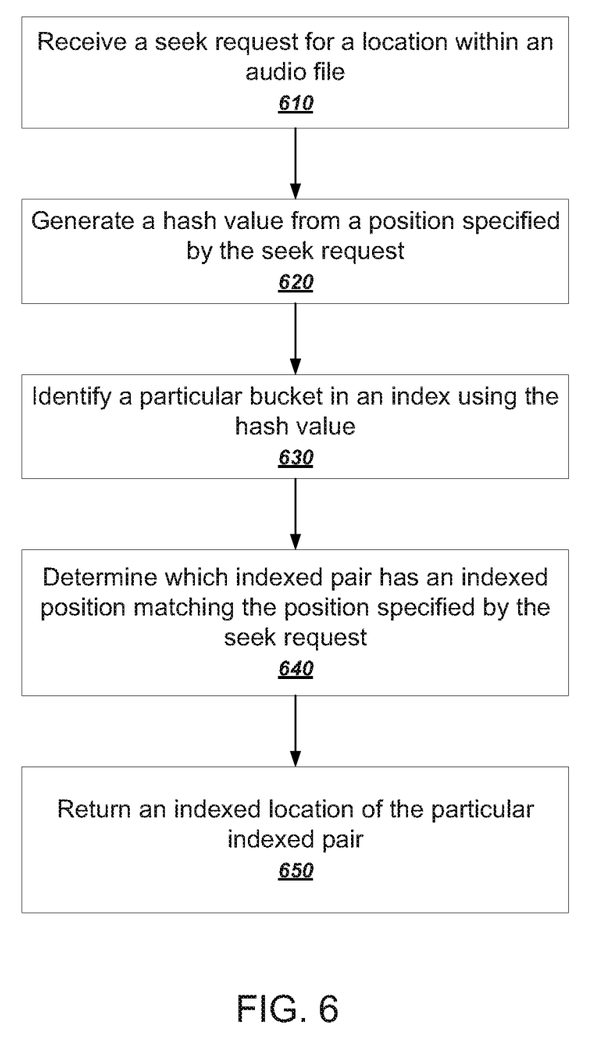
FIG. 6 is a flow chart of an example process for using an index to respond to a seek request.

FIG. 6 is a flow chart of an example process for using an index to respond to a seek request. The example process can be performed by a decoder that receives a seek request to initiate playback of an audio file from a particular position in the original audio signal. For convenience, the process will be described as being performed by a system of one or more computers, located in one or more locations, and programmed appropriately in accordance with this specification. For example, an audio encoding system, e.g., the audio decoding system 103 of FIG. 1, appropriately programmed, can perform the process.

The system receives a seek request with respect to an audio file (e.g., a seek request for a location within an audio file) (610). The seek request can specify a position within the original audio signal represented by the audio file. In general, the position indicates a seek position or playback position within the audio signal, for initiating or resuming playback, e.g., anywhere between the first sample of the audio signal and the last sample of the audio signal. The position can be specified either as a number of audio frames into the audio file as a time offset from the start of the audio signal, or as a sample offset. If the seek request specifies a time offset, the system can convert the time offset to an audio frame by multiplying the time offset by the frame rate of the audio file. The position can also be specified as a sample offset, e.g., from the start of the audio signal. The system can convert the sample offset to the time offset by dividing the sample offset by the sample rate, or to an audio frame by dividing the sample offset by the number of samples per frame.

The seek request may also specify a particular index to search. If the system cannot locate the index specified by the seek request, the system can regenerate the index, e.g., either when the audio file is opened or when the seek request is received.

The system generates a hash value from the position specified by the seek request (e.g., from an audio frame specified by the seek request) (620), and the system identifies a particular bucket in an index using the hash value (630). The hash value may be generated by applying the hash function to the position specified by the seek request. The system can use an index that has a plurality of buckets, each with an identifier corresponding a possible hash value from the hash function. In general, unless the audio file is very small, the index will have multiple buckets. The bucket is identified by searching for a bucket whose identifier corresponds to (e.g., is identical) to the hash value generated at 620.

The system determines which indexed pair has an indexed position matching the position specified by the seek request (640). To find a matching position, the system searches through the bucket identified by the hash value to find an indexed position that most closely matches the position of the seek request. In some implementations, the system only identifies an indexed position that is also less than the position of the seek request. This is so that playback will begin at a location that includes at least the position identified by the seek request (e.g., so that playback includes a portion or instance of the audio signal corresponding to the position identified by the seek request).

The system then returns the indexed location of the particular indexed pair (650).

Figure 7:
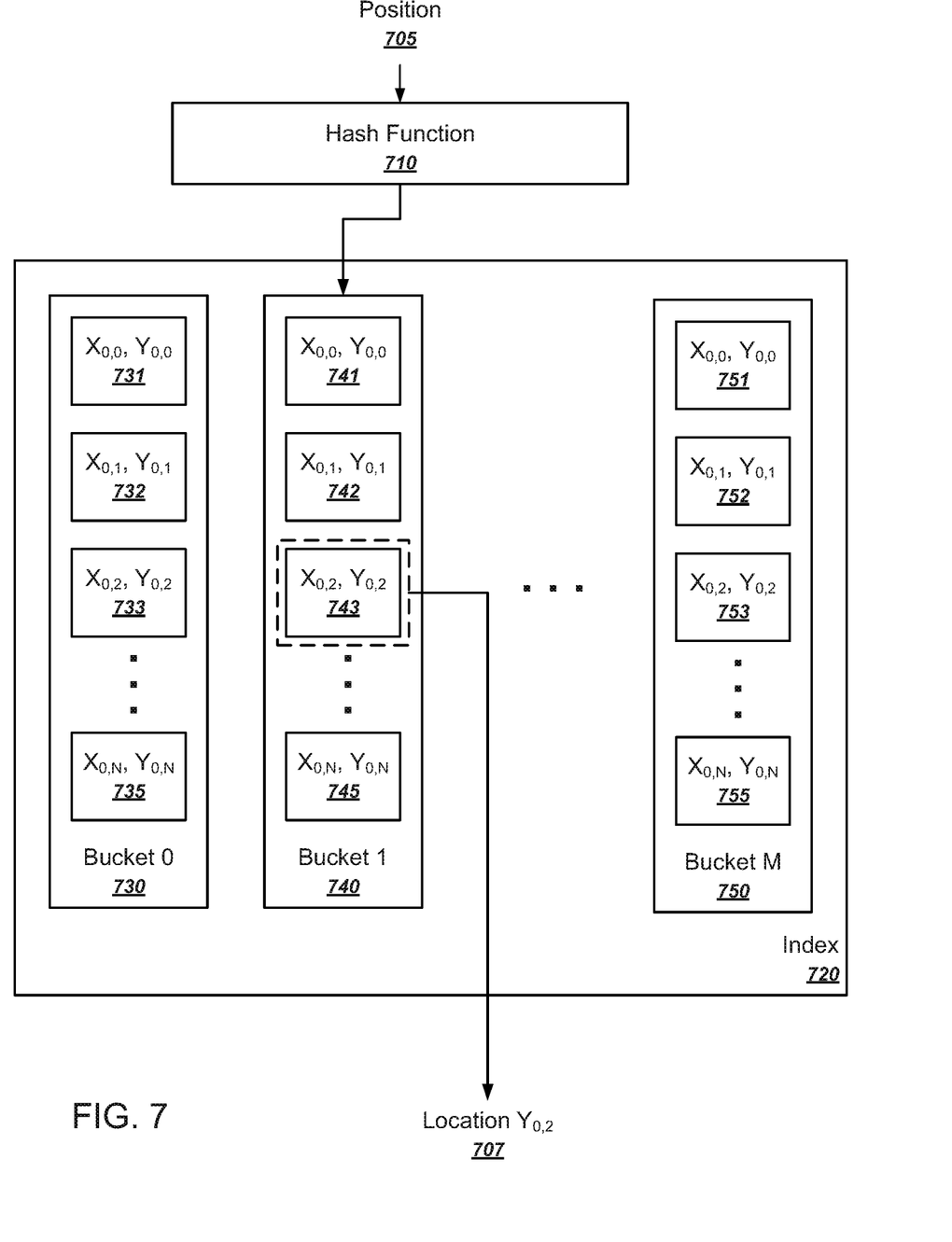
FIG. 7 is a diagram of an example index.

FIG. 7 is a diagram of an example index 720. The index 720 has a plurality of buckets 0-M 730, 740, through 750. Within each bucket are indexed pairs, e.g., indexed pairs 731-735, 741-745, and 751-755. Each indexed pair includes an indexed position, e.g., $X_{a,b}$, and an indexed file location, e.g., $Y_{a,b}$.

The system uses the position 705 of the seek request as input to the hash function 710, which generates a hash value. In this example, this hash value identifies bucket 1 740.

The system can then sequentially search through the entries in bucket 1 to identify an entry (a position, location pair) having an indexed position that is closest to the position 705. In this example, the system identifies the entry 743 and returns the location $Y_{0,2}$ 707.

The gap, if any, between the position specified by the seek request and the returned indexed position can be referred to as the frame mismatch. In case of frame mismatch, the decoder of the system can silently decode the audio file starting from the returned location until reaching the position of the seek request. In some implementations, the system generates enough hash entries to ensure that elapsed time of the worst-case of silent decoding does not exceed a threshold value.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various aspects of the present invention may be appreciated from the following enumerated example embodiments (EEEs):

EEE 1. A computer-implemented method comprising:
    receiving a seek request for a location within an audio file, wherein the audio file comprises a variable bit stream representation of an audio signal, wherein the seek request includes a specified position within the audio signal, wherein the variable bit stream representation comprises multiple portions that each represent one or more audio samples of the audio signal, and wherein at least two of the multiple portions have different respective bit rates;
    generating a hash value from the specified position of the seek request using a hash function;
    identifying, using the hash value, a particular bucket in an index having a plurality of buckets, each bucket having a plurality of indexed pairs, wherein each respective indexed pair comprises an indexed position within the audio signal and an indexed location within the audio file corresponding to the indexed position, and wherein the hash function generates a same hash value for each indexed location of all indexed pairs within a bucket;

determining which particular indexed pair of the indexed pairs within the particular bucket has an indexed position that matches the specified position among indexed pairs in the bucket having indexed positions that are less than or equal to the specified position of the seek request; and returning a particular indexed location of the particular indexed pair in response to the seek request.

EEE 2. The method of EEE 1, further comprising:
opening the audio file; and
initiating playback from the particular indexed location within the audio file.

EEE 3. The method of EEE 2, further comprising:
computing a difference between the specified position and the indexed position of the particular indexed pair; and
skipping an amount of the audio signal after the particular indexed location corresponding to the difference between the specified position and the particular indexed position.

EEE 4. The method of any one of EEEs 1-3, wherein identifying a particular indexed pair of the indexed pairs within the particular bucket comprises sequentially processing all indexed pairs within the bucket.

EEE 5. The method of any one of EEEs 1-4, wherein indexed pairs within a bucket are stored in an array, and wherein identifying a particular indexed pair of the indexed pairs within the particular bucket comprises performing a linear search through the array for an indexed position that is closest to the specified position among indexed positions in the bucket that are less than or equal to the specified position of the seek request.

EEE 6. The method of any one of EEEs 1-5, wherein indexed pairs within a bucket are unordered.

EEE 7. The method of any one of EEEs 1-6, wherein the plurality of buckets are stored in an index file separate from the audio file.

EEE 8. The method of any one of EEEs 1-6, wherein the plurality of buckets are encoded within the audio file.

EEE 9. The method of any one of EEEs 1-8, further comprising generating the index, including:
repeatedly receiving audio frames of the audio file; and
performing the following operations for each received audio frame:
determining a position within the audio file corresponding to the audio frame,
determining a location within the audio signal corresponding to the position,
computing a hash value from the determined position using the hash function,
identifying a particular bucket of the plurality of buckets identified by the computed hash value,
generating an indexed pair comprising the determined position and the determined location, and
storing the indexed pair in association with the particular bucket.

EEE 10. The method of EEE 9, further comprising generating the index upon opening the audio file.

EEE 11. The method of any one of EEEs 1-10, wherein the index is stored at a particular network location associated with the audio file.

EEE 12. A computer-implemented method comprising:
repeatedly receiving audio frames of a variable bit stream representation of an audio signal, wherein the variable bit stream representation comprises multiple portions that each represent one or more audio samples of the audio signal, and wherein at least two of the multiple portions have different respective bit rates; and
performing the following operations for each received audio frame:
determining a position within the audio signal corresponding to the audio frame,
determining a location within an audio file corresponding to the position,
computing a hash value from the determined position,
identifying a particular bucket of a plurality of buckets, the particular bucket being identified by the computed hash value,
generating an indexed pair comprising the determined position and the determined location, and
storing the indexed pair in association with the particular bucket.

EEE 13. The method of EEE 12, wherein repeatedly receiving audio frames comprises repeatedly receiving audio frames during an encoding process that generates the audio file from an audio signal.

EEE 14. The method of EEE 12, wherein repeatedly receiving audio frames comprises reading audio frames from the audio file.

EEE 15. The method of any one of EEEs 12-14, wherein receiving audio frames comprises receiving audio frames that are designated as major audio frames, wherein the variable bit stream representation has regular audio frames and major audio frames, and wherein playback can be initiated for the variable bit stream representation only from audio frames that are designated as major audio frames.

EEE 16. The method of any one of EEEs 12-15, wherein indexed pairs within a bucket are unordered.

EEE 17. The method of any one of EEEs 12-16, further comprising storing the index at a particular network location associated with the audio file.

EEE 18. A system comprising: one or more computers and one or more storage devices storing instructions that are operable, when executed by the one or more computers, to cause the one or more computers to perform the method of any one of EEEs 1 to 17.

EEE 19. A computer storage medium encoded with a computer program, the program comprising instructions that are operable, when executed by data processing apparatus, to cause the data processing apparatus to perform the method of any one of EEEs 1 to 17.

The invention claimed is:

1. A computer-implemented method comprising:
receiving a seek request with respect to an audio file, wherein the audio file comprises a variable bit rate representation of an audio signal, wherein the seek request includes a specified position within the audio signal, wherein the variable bit rate representation comprises multiple portions that each represent one or more audio samples of the audio signal, and wherein at least two of the multiple portions have different respective bit rates;
generating a hash value from the specified position of the seek request using a hash function;
identifying, using the hash value, a particular bucket in an index having a plurality of buckets, each bucket having a plurality of indexed pairs, wherein each respective indexed pair comprises an indexed position within the audio signal and an indexed location within the audio file corresponding to the indexed position, and wherein for a given bucket, indexed positions of all indexed pairs within the given bucket have a same hash value;

determining which particular indexed pair of the indexed pairs within the particular bucket has an indexed position that matches the specified position among indexed pairs in the bucket having indexed positions that are less than or equal to the specified position of the seek request; and returning a particular indexed location of the particular indexed pair in response to the seek request.

2. The method of claim 1, further comprising:
opening the audio file; and
initiating playback from the particular indexed location within the audio file.

3. The method of claim 2, further comprising:
computing a difference between the specified position and the indexed position of the particular indexed pair; and
skipping an amount of the audio signal after the particular indexed location corresponding to the difference between the specified position and the particular indexed position.

4. The method of claim 1, wherein identifying a particular indexed pair of the indexed pairs within the particular bucket comprises sequentially processing all indexed pairs within the particular bucket.

5. The method of claim 1, wherein indexed pairs within a bucket are stored in an array, and wherein identifying a particular indexed pair of the indexed pairs within the particular bucket comprises performing a linear search through the array for an indexed position that is closest to the specified position among indexed positions in the bucket that are less than or equal to the specified position of the seek request.

6. The method of claim 1, wherein each bucket of the index represents a respective array of indexed pairs and has a respective identifier corresponding to the hash values of the positions of the indexed pairs in the bucket; and/or
wherein indexed pairs within each bucket are unordered.

7. The method of claim 1, wherein the plurality of buckets are stored in an index file separate from the audio file, or wherein the plurality of buckets are encoded within the audio file.

8. The method of claim 1, further comprising generating the index, including:
repeatedly receiving audio frames of the audio file; and
performing the following operations for each received audio frame:
determining a location within the audio file corresponding to the audio frame,
determining a position within the audio signal corresponding to the location,
computing a hash value from the determined position using the hash function,
identifying a particular bucket of the plurality of buckets, the particular bucket being identified by the computed hash value,
generating an indexed pair comprising the determined position and the determined location, and
storing the indexed pair in association with the particular bucket.

9. The method of claim 8, further comprising generating the index upon opening the audio file.

10. The method of claim 1, wherein the index is stored at a particular network location associated with the audio file.

11. A computer-implemented method comprising:
repeatedly receiving audio frames of a variable bit rate representation of an audio signal, wherein the variable bit rate representation comprises multiple portions that each represent one or more audio samples of the audio signal, and wherein at least two of the multiple portions have different respective bit rates; and
performing the following operations for each received audio frame:
determining a position within the audio signal corresponding to the audio frame,
determining a location within an audio file corresponding to the position,
computing a hash value from the determined position,
identifying a particular bucket of a plurality of buckets, the particular bucket being identified by the computed hash value,
generating an indexed pair comprising the determined position and the determined location, and
storing the indexed pair in association with the particular bucket.

12. The method of claim 11, wherein repeatedly receiving audio frames comprises repeatedly receiving audio frames during an encoding process that generates the audio file from the audio signal, or
wherein repeatedly receiving audio frames comprises reading audio frames from the audio file.

13. The method of claim 11, wherein receiving audio frames comprises receiving audio frames that are designated as major audio frames, wherein the variable bit rate representation has regular audio frames and major audio frames, and wherein playback can be initiated for the variable bit stream representation only from audio frames that are designated as major audio frames.

14. The method of claim 11, wherein each bucket of the index represents a respective array of indexed pairs and has a respective identifier corresponding to the hash values of the positions of the indexed pairs in the bucket; and/or
wherein indexed pairs within each bucket are unordered.

15. The method of claim 11, further comprising storing the index at a particular network location associated with the audio file.

16. A system comprising: one or more computers and one or more storage devices storing instructions that are operable, when executed by the one or more computers, to cause the one or more computers to perform the method of claim 11.

17. A computer storage medium encoded with a computer program, the program comprising instructions that are operable, when executed by data processing apparatus, to cause the data processing apparatus to perform the method of claim 11.

* * * * *